US010810464B2

(12) United States Patent
Okuno

(10) Patent No.: US 10,810,464 B2
(45) Date of Patent: Oct. 20, 2020

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yasuhiro Okuno, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 206 days.

(21) Appl. No.: 15/927,965

(22) Filed: Mar. 21, 2018

(65) Prior Publication Data
US 2018/0276503 A1 Sep. 27, 2018

(30) Foreign Application Priority Data
Mar. 24, 2017 (JP) ................. 2017-059238

(51) Int. Cl.
*G06K 9/62* (2006.01)
*G06N 3/04* (2006.01)
*G06N 3/08* (2006.01)

(52) U.S. Cl.
CPC ......... *G06K 9/6262* (2013.01); *G06K 9/6264* (2013.01); *G06K 9/6268* (2013.01); *G06N 3/0445* (2013.01); *G06N 3/084* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 2017/0236055 | A1* | 8/2017 | Lin | G06F 16/583 |
| | | | | 706/20 |
| 2018/0012110 | A1* | 1/2018 | Souche | G06N 3/0454 |
| 2018/0060722 | A1* | 3/2018 | Hwang | G06N 3/0454 |
| 2018/0253865 | A1* | 9/2018 | Price | G06K 9/4652 |
| 2019/0034800 | A1* | 1/2019 | Shiratani | G06K 9/4628 |
| 2019/0354744 | A1* | 11/2019 | Chaloux | G06F 16/951 |

FOREIGN PATENT DOCUMENTS

JP 201662225 A 4/2016

OTHER PUBLICATIONS

Karen Simonyan; Deep inside convolutional networks: Visualising image classification models and saliency maps; Apr. 19, 2014 ; pp. 1-8; Visual Geometry Group, University of Oxford.

* cited by examiner

*Primary Examiner* — Kim Y Vu
*Assistant Examiner* — Nathan J Bloom
(74) *Attorney, Agent, or Firm* — Canon U.S.A., Inc. IP Division

(57) ABSTRACT

An information processing apparatus includes a storing unit that stores a neural network that recognizes a data characteristic of data, and a correction unit that corrects the data by using the neural network stored in the storing unit such that the neural network recognizes that the data characteristic of the data is a predetermined data characteristic.

13 Claims, 11 Drawing Sheets

INFORMATION PROCESSING APPARATUS, INFORMATION PROCESSING METHOD, AND STORAGE MEDIUM

BACKGROUND

Field of the Disclosure

The present disclosure relates to a technique for correcting an inherent characteristic of predetermined data characteristics of an input data.

Description of the Related Art

A method of generating an image on which a neural network makes a determination is disclosed in Simonyan, K., Vedaldi, A., & Zisserman, A. (2013). Deep inside convolutional networks: Visualising image classification models and saliency maps, arXiv preprint arXiv:1312.6034. Specifically, parameters and teacher values of the neural network are fixed, and an input image is updated such that the neural network outputs the teacher values.

SUMMARY

The present disclosure provides an information processing apparatus including a storing unit that stores a neural network that recognizes a data characteristic of data, and a correction unit that corrects the data by using the neural network stored in the storing unit such that the neural network recognizes that the data characteristic of the data is a predetermined data characteristic.

Further features of the present disclosure will become apparent from the following description of exemplary embodiments with reference to the attached drawings.

DESCRIPTION OF THE EMBODIMENTS

First Embodiment

Figure 1:
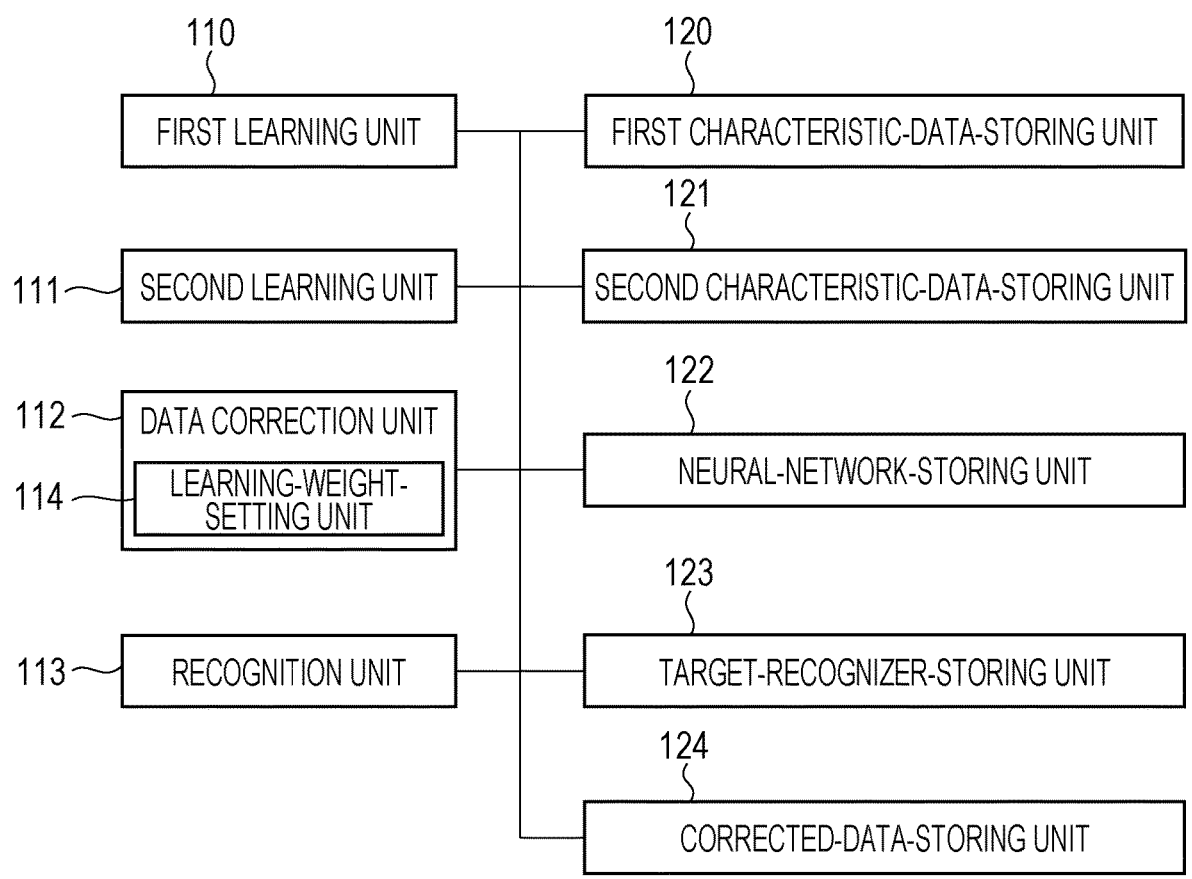
FIG. 1 is a schematic block diagram of an information processing apparatus according to one or more aspects of the present disclosure.

A first embodiment of the present disclosure will hereinafter be described in detail with reference to the drawings. According to the present embodiment, a CG (computer graphics) image is an input image, and an image obtained by correcting a characteristic inherent in the CG image, that is, an image having characteristics similar to those of a photographed image is generated. The following description includes an example of use of the image obtained by correcting the characteristic inherent in the CG image according to the present embodiment.

When a recognizer that recognizes data such as image data or sound data learns, data used as learning data is typically generated artificially. For example, in Japanese Patent Laid-Open No. 2016-62225, when a human face detector learns, many face images are generated by CG under different illumination conditions and used as the learning data. Artificially generating the learning data enables a large variety of images to be easily prepared more than in the case where images are actually photographed.

What is considered herein is a case where a recognizer learns to recognize whether there is a specific object (for example, a human face) in an image. In general, an image that is to be recognized (positive case) and an image that is not to be recognized (negative case) are prepared as learning data, and these images are used for learning. A learning image may be generated by CG as in Japanese Patent Laid-Open No. 2016-62225. In this case, the image in the positive case is typically generated by CG but the image in the negative case is not typically generated by CG. The reason is that a 3D model is needed to generate a CG image, and 3D modeling for all objects that are not to be recognized is complicated. The image in the negative case includes no object that is to be recognized. Such images are relatively easily collected, and few images in the negative case are generated by CG.

In some cases, when learning data including CG images in the positive case and no CG images in the negative case is thus used for learning, the recognizer learns so as to recognize whether an image is a CG image. This is because each CG image in the learning data always corresponds to the positive case, and accordingly, the reason for which an image is recognized to be in the positive case cannot be distinguished between a characteristic of the object in the image and the fact that the image is a CG image. For example, a recognizer that learns with a neural network strongly reacts to not only a face-like image characteristic but also an image characteristic inherent in CG. Examples of the characteristic inherent in CG include a uniform area having no noise, a color having a high degree of saturation, and excessively regulated gradation on a simple illumination model. In some cases, a learning process reacts to a statistical characteristic difference between a CG image and a photographed image, for example, even though a person is not aware of the difference between the CG image and the photographed image or feels that there is not a big difference therebetween.

An image that is inputted during recognition is a photographed image, which has no characteristic inherent in CG. The recognizer that has learned characteristics inherent in CG as above is likely to fail recognition, and there is a problem in that the performance of recognition decreases.

According to the present embodiment, an image obtained by correcting a characteristic inherent in the CG image is generated. For example, use of the corrected image as the learning data enables the accuracy of recognition by the recognizer to be inhibited from decreasing.

In the following description, according to the present embodiment, the data is image data. The data, however, may be another data such as sound data. In an example described below, the output of a recognition process is the result representing whether there is a certain object (for example, a human face, an automobile, or a sign) in the image. The present embodiment, however, is not limited thereto. For example, the recognizer may output an evaluation value (for example, the degree of a smile of a face, an age, or the number of automobiles) of the image. In the following description, an object to be recognized is referred to as a "target".

FIG. 1 is a schematic block diagram of an information processing apparatus according to the present embodiment. A first characteristic-data-storing unit 120 and a second characteristic-data-storing unit 121 store learning data for learning a certain target and are separated from each other depending on data characteristics. The first characteristic-data-storing unit 120 stores sets of first characteristic data having a first data characteristic. The second characteristic-data-storing unit 121 stores sets of second characteristic data having a second data characteristic.

The "data characteristic" is not a characteristic of the content of data but is a characteristic resulted from a method of generating or obtaining the data. In the case of an image, the data characteristic is not a characteristic representing what is contained in the image but is a characteristic representing a method of generating the image, for example, whether the image is generated by CG or photographed.

The kind of photography equipment that is used and kind of photography environment are other examples other than the data characteristics of CG and photographed images. Also in the case where the data characteristic is the kind of the photography equipment that is used or the kind of the photography environment, when the recognizer learns with learning data including data of the positive case and data of the negative case having a characteristic different from that in the positive case, the recognizer is likely to react a difference between the data characteristics, and there is a possibility that the accuracy of recognition decreases. The reason is that characteristics such as a contrast, a dynamic range, a range of color reproduction, tendency of a color tone, and noise characteristics differ depending on the kind of the photography equipment, and the photography equipment can be recognized from the image. In addition, the photography environment cart be recognized from the image with a background of each environment or illumination conditions in some cases.

According to the present embodiment, the kind of the data characteristic is not particularly limited. In the following description, the first data characteristic is a data characteristic of actual data such as data of a photographed image obtained by photographing an actual object with, for example, a camera. The second data characteristic is a data characteristic of artificial data such as data of a CG image. In the description according to the present embodiment, the data is image data. However, sound data can be used in the same manner as the above example. For example, the first data characteristic may be a recording data characteristic of a sound that is actually recorded, and the second data characteristic may be an artificial sound data characteristic of a sound obtained by artificial speech synthesis.

The data stored in the first characteristic-data-storing unit 120 and the second characteristic-data-storing unit 121 is the learning data for learning a certain target. The sets of the data are labeled with respective target labels in advance. The target labels are teacher values of two classes that represent whether the image contains a human face and whether the image contains no human face, for example, when the target to be recognized is the human face. The labels are attached in accordance with the content of the image unlike the above data characteristics. For example, the target label for a face image is 0, and the target label for a non-face image is 1. Each target label is not limited to a simple binary label as above and may be a value representing an object to be recognized, a real number, or a vector value. Examples of a method of associating each data with the label may include creating a table of the file name of the data and the name of the label and storing the table at the same location as the data.

A neural-network-storing unit 122 stores a data-characteristic-recognizing neural network (network structures and learning parameters) serving as a recognizer that recognizes the data characteristics. Examples of the learning parameters include parameters that the data-characteristic-recognizing neural network learns, such as bias values and connection weights of networks. The structure of the neural network includes the number of intermediate layers, the number of units (neurons) of each intermediate layer, and the connection structure of each unit. These are stored in the neural-network-storing unit 122 after a first learning unit 110 described later performs a learning process.

A target-recognizer-storing unit 123 stores a recognizer that recognizes the target, and a second learning unit 111 described later performs a learning process of the recognizer.

The first learning unit 110 and the second learning unit 111 are functional units that perform learning processes or the data-characteristic-recognizing neural network stored in the neural-network-storing unit 122 and the recognizer stored in the target-recognizer-storing unit 123. The contents of learning by the first learning unit 110 and the second learning unit 111, that is, the targets to be recognized differ from each other, and the detail thereof will be described later.

A data correction unit 112 corrects the second characteristic data stored in the second characteristic-data-storing unit 121. The data correction unit 112 includes a functional unit such as a learning-weight-setting unit 114 that sets a weight used when the second learning unit 111 performs the learning process with the corrected second characteristic data. A recognition unit 113 performs a recognition process on unknown image data. A corrected-data-storing unit 124 stores the second characteristic data corrected by the data correction unit 112.

The information processing apparatus according to the present embodiment includes hardware such as a CPU, a ROM, a RAM, and a HDD. The CPU runs programs stored in, for example, the ROM or HD to achieve, for example, the above functional configurations and processes in flowcharts described later. The RAM has a storage area that functions as a working area in which the CPU loads and runs the programs. The ROM has a storage area in which the programs that the CPU runs are stored. The HD has a storage area in which various data including data related to the programs that the CPU runs is stored.

Figure 2:
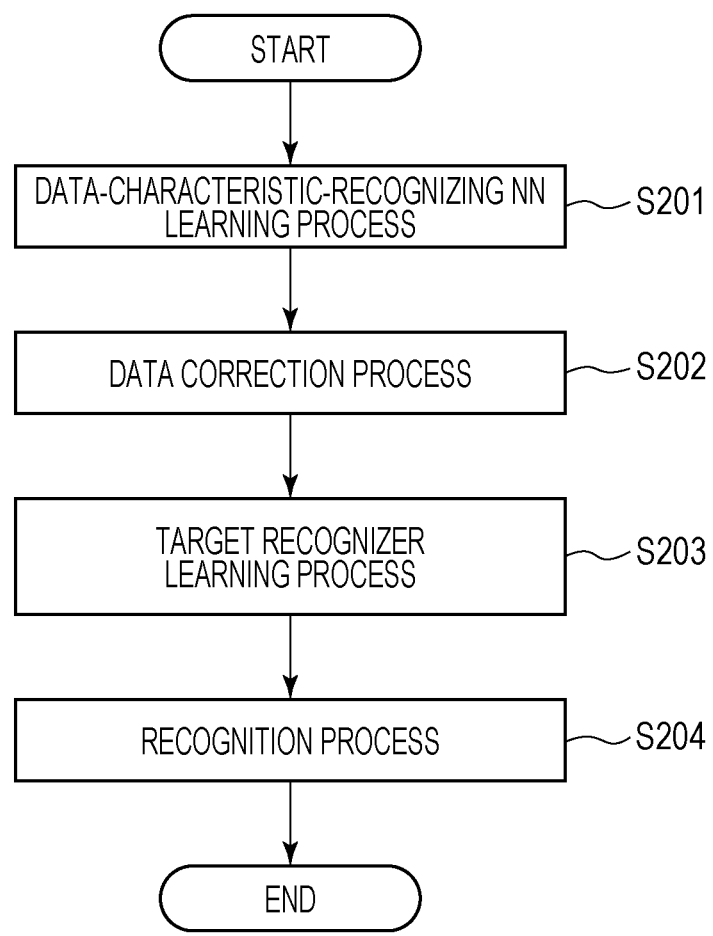
FIG. 2 is a flowchart of a process of the information processing apparatus according to one or more aspects of the present disclosure.

The entire process flow of the information processing apparatus according to the present embodiment will now be described. FIG. 2 is a flowchart of the process of the information processing apparatus according to the present embodiment. At a step S201, the first learning unit 110 performs the learning process of the data-characteristic-recognizing neural network. The first learning unit 110 uses the first characteristic data stored in the first characteristic-data-storing unit 120 and the second characteristic data stored in the second characteristic-data-storing unit 121 as the learning data to perform the learning process of the data-characteristic-recognizing neural network as the recognizer that recognizes the data characteristics.

The first characteristic data is labeled with a data characteristic label representing the first data characteristic. The second characteristic data is labeled with a data characteristic label representing the second data characteristic. The data characteristic labels differ from the above target labels. The first learning unit 110 performs the learning process of the data-characteristic-recognizing neural network so that the two can be distinguished from each other. The first learning unit 110 thus performs the learning process and stores the data-characteristic-recognizing neural network for distinguishing between the first characteristic data and the second characteristic data in the neural-network-storing unit 122.

Figure 5:
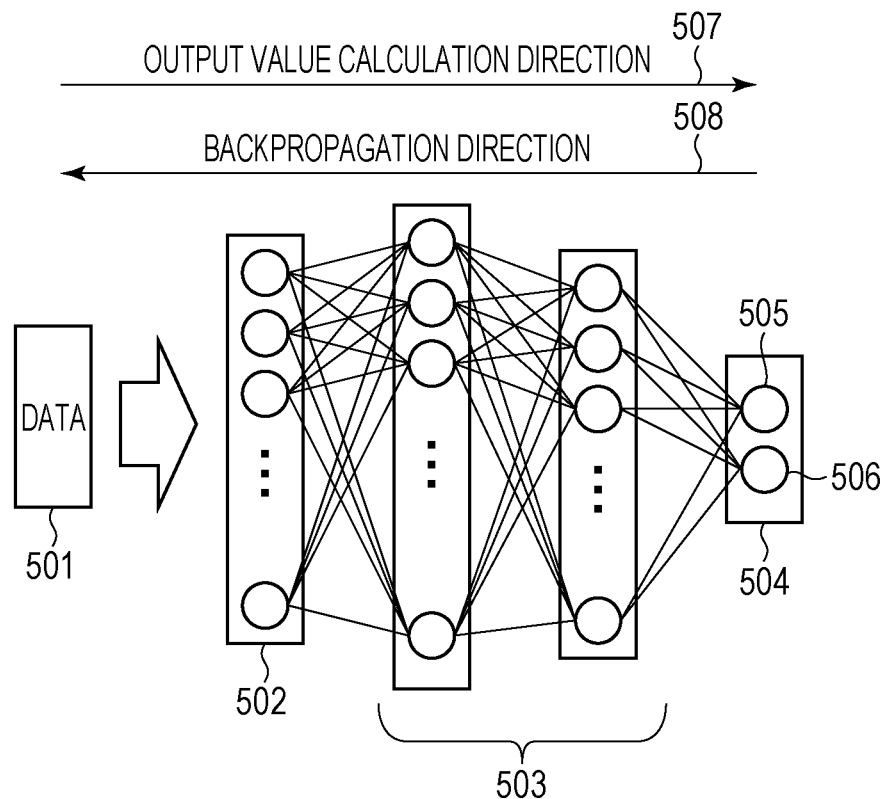
FIG. 5 is a schematic view of a data-characteristic-recognizing neural network according to one or more aspects of the present disclosure.

FIG. 5 is a schematic view of an example of the data-characteristic-recognizing neural network of which the learning process is performed by the first learning unit 110 according to the present embodiment. In the data-characteristic-recognizing neural network illustrated in FIG. 5, data 501 is inputted into an input layer 502, and data is outputted to an output layer 504 for representing two classes of a photographed image class and a CG image class via one or more intermediate layers 503. Each layer of the neural network includes units (neurons). The output layer is represented by 1-of-k representation, and is configured in a manner in which, when a label is L (L is an integer), the value of the L-th unit is 1, and the values of the other units are 0. During recognition, the value of each unit of the output layer is processed by the softmax function such that the sum total becomes 1. The value of each unit of the output layer can be regarded as class possibility for each class. In the output layer 504, class possibility that the data is photographed image data (first data characteristic) is outputted to a unit 505, and class possibility that the data is CG image data (second data characteristic) is outputted to a unit 506.

The structure of the neural network is not limited to the embodiment and may be, for example, the structure of a convolutional neural network as disclosed in Simonyan Learning methods of the neural network are well-known techniques, and a detailed description thereof is omitted. Backpropagation, for example, may be used. In FIG. 5, an arrow 507 represents a feedforward direction in which the output values of the neural network are calculated, and an arrow 508 represents a feedback direction in the backpropagation.

Subsequently, at a step S202, the data correction unit 112 corrects the second characteristic data stored in the second characteristic-data-storing unit 121 and stores the corrected data in the corrected-data-storing unit 124.

The data correction unit 112 corrects the second characteristic data such that the data-characteristic-recognizing neural network that has learned at the step S201 recognizes that the corrected second characteristic data is the first data characteristic. According to the present embodiment, the data is image data, and the data correction unit 112 corrects the image data. The first data characteristic is a characteristic of photographed image data (actual data). The second data characteristic is a characteristics of CG image data (artificial data). Accordingly, the data correction unit 112 corrects the second characteristic data such that the corrected CG image data is recognized to be photographed image data. The method of correcting the data by the data correction unit 112 will be described in detail later.

At the step S202, the data correction unit 112 associates the target label attached to the second characteristic data before correction with the corrected second characteristic data and stores the target label in the corrected-data-storing unit 124. The data correction unit 112 associates a learning weight calculated by the learning-weight-setting unit 114 with the corrected second characteristic data and also stores the learning weight in the corrected-data-storing unit 124. The learning weight is a real number ranging from 0 to 1 and represents how much weight is to be placed on learning of each data in a learning process at a next step S203. The process of the learning-weight-setting unit 114 will be described in detail later. Examples of the process of associating the target label and the learning weight value with the corrected second characteristic data and storing these may include creating a table of the file name of the corrected second characteristic data, the target label, and the learning weight value and storing the table in the corrected-data-storing unit 124.

Subsequently, at the step S203, the second learning unit 111 performs the learning process of a target recognizer that recognizes the target. The second learning unit 111 uses the corrected second characteristic data stored in the corrected-data-storing unit 124 and the first characteristic data stored in the first characteristic-data-storing unit 120 as the learning data to perform the learning process of the target recognizer that recognizes whether the target to be recognized is contained. The corrected second characteristic data and the first characteristic data are labeled with the target labels as in the above description. The second learning unit 111 performs the learning process by using these.

The corrected second characteristic data has the learning weight as above. The learning process is performed in accordance with the learning weight of each data. The learning weight of the first characteristic data is 1 in the learning process.

The second learning unit 111 performs the above learning process of the target recognizer that determines whether the image data contains the target and stores the target recognizer in the target-recognizer-storing unit 123. The target recognizer of which the learning process is performed by the second learning unit 111 is not limited to a specific method and may use a neural network, for example, as in the first learning unit 110. Another method such as a support vector machine (SVM) or a decision tree may be used. Learning methods when these methods are used are well-known techniques, and a detailed description thereof is omitted.

Subsequently, at a step S204, the recognition unit 113 performs a recognition process on unknown image data. For example, the recognition unit 113 performs the recognition process on image data specified by a user by using the target recognizer stored in the target-recognizer-storing unit 123 and outputs the result of recognition. After the target recognizer learns at the step S203, the recognition process at the step S204 can be performed multiple times on any input image.

In the above description, the first characteristic data and the second characteristic data that are used by the first learning unit 110 are common to the first characteristic data and the second characteristic data that are used by the second learning unit 111 for simplicity of description. For this reason, the data characteristic labels and the target labels are attached to the first characteristic data and the second characteristic data. However, the first characteristic data and the second characteristic data that are used by the first learning unit 110 may differ from the first characteristic data and the second characteristic data that are used by the second learning unit 111. In this case, it is only necessary to attach the data characteristic labels to the first characteristic data and the second characteristic data that are used by the first learning unit 110, and the target labels are not necessarily attached thereto. It is only necessary to attach the target labels to the first characteristic data and the second characteristic data that are used by the second learning unit 111, and the data characteristic labels are not necessarily attached thereto. In this case, the first characteristic data and the second characteristic data cannot be distinguished from each other, and accordingly, all data used as the learning data of the second learning unit 111 may be corrected.

In the information processing apparatus according to the present embodiment, all of the processes at steps S201 to S204 are performed. However, all of the processes are not necessarily performed in the information processing apparatus according to the present embodiment. That is, another apparatus may perform the learning process of the data-characteristic-recognizing neural network at the step S201, and the information processing apparatus according to the present embodiment may obtain the data-characteristic-recognizing neural network after the learning process to use the data-characteristic-recognizing neural network at the step S202. Another apparatus may perform the learning process of the target recognizer at the step S203 by using the second characteristic data corrected by the information processing apparatus according to the present embodiment. Another apparatus may perform the recognition process at the step S204. This completes the description of the entire process flow of the information processing apparatus according to the present embodiment.

Figure 3:
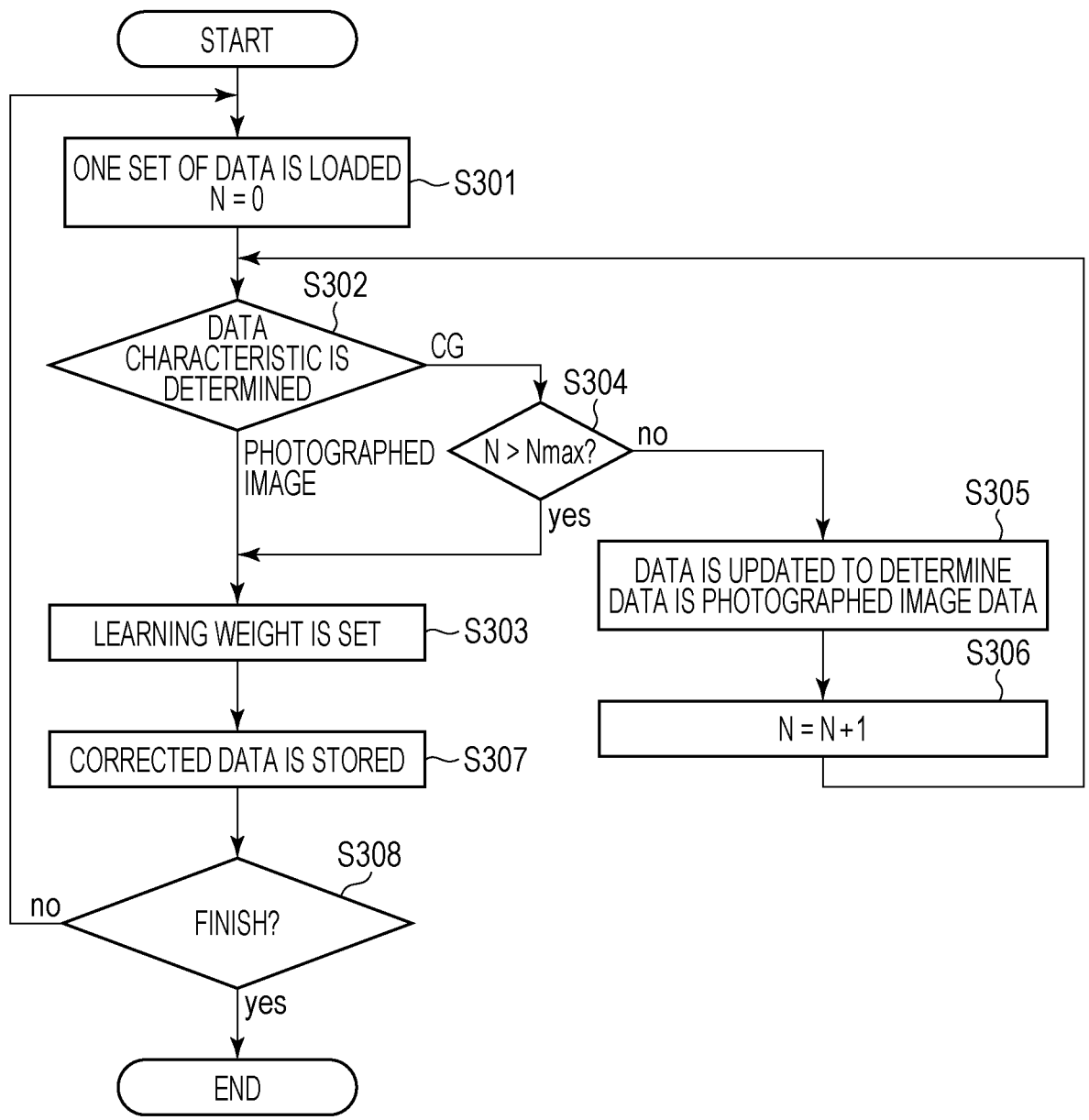
FIG. 3 is a flowchart of a process of a data correction unit according to one or more aspects of the present disclosure.

A correction process of the data correction unit 112 according to the present embodiment will now be described. FIG. 3 is a flowchart of the correction process according to the present embodiment. At a step S301, the data correction unit 112 loads a set of the second characteristic data from the second characteristic-data-storing unit 121. A variable N representing the number of times a data-updating process described later is repeatedly performed is initialized to 0.

Subsequently, at a step S302, the data correction unit 112 determines the data characteristic of the data loaded at the previous step S301 by using the data-characteristic-recognizing neural network stored in the neural-network-storing unit 122. According to the present embodiment, since the first data characteristic is the characteristic of the photographed image data, and the second data characteristic is the characteristics of the CG image data, whether the inputted data is photographed image data or CG image data is determined.

According to the present embodiment, when photographed image class possibility in the output layer 504 of the data-characteristic-recognizing neural network is greater than CG class possibility by a predetermined threshold or more, the data is recognized to be photographed image data. In the following description, the threshold is referred to as a photographed image determination threshold. The photographed image determination threshold is a real number ranging from 0 to 0.5. For example, in the case where, when the photographed image class possibility is greater than the CG class possibility by 0.2 or more, determination that the data is photographed image data is to be made, the photographed image determination threshold is set to 0.2. In this case, when the photographed image class possibility is equal to or more than 0.6, the determination that the data is photographed image data is made.

A user may decide the photographed image determination threshold. Alternatively, the threshold may be decided in a manner in which the values in the output layer 504 with respect to sample data are checked after the learning process of the recognizer with CG images and photographed images, and the threshold is adjusted to improve the accuracy of determination of the photographed image data. When the data is determined to be photographed image data (first data characteristic) at the step S302, the flow proceeds to a step S303. When the data is determined to be CG image data (second data characteristic), the flow proceeds to a step S304.

At the step S304, the data correction unit 112 determines whether the variable N representing the number of times the data-updating process is repeatedly performed exceeds a predetermined threshold Nmax. The threshold Nmax represents the upper limit of the number of times the data-updating process is repeatedly performed and is a constant that is predetermined by a user according to the present embodiment. When the variable N is equal to or less than the threshold Nmax, the flow proceeds to a step S305. When the variable N exceeds the threshold Nmax, the flow proceeds to the step S303.

At the step S305, the data correction unit 112 updates the data such that the data-characteristic-recognizing neural network recognizes the data has the first data characteristic (photographed image). This is the same process as disclosed in Simonyan. The data-updating process at the step S305 will be described in more detail with reference to a flowchart in FIG. 4.

Figure 4:
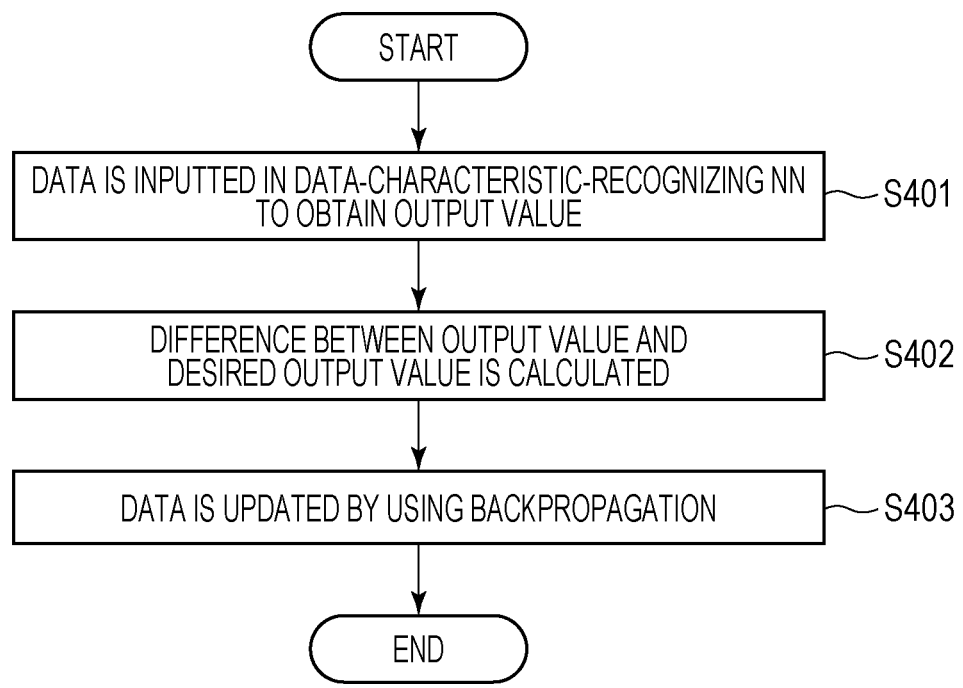
FIG. 4 is a flowchart of the detail of a data-updating process according to one or more aspects of the present disclosure.

FIG. 4 is the flowchart of the detail of the data-updating process according to the present embodiment. At a step S401, the data correction unit 112 inputs the data into the data-characteristic-recognizing neural network and obtains output values. At the step S401, a feedforward process is performed in the direction of the arrow 507 representing an output value calculation direction in FIG. 5 and the output values are obtained. The output values are values (505 and 506) of the units of the output layer 504 in FIG. 5 and represent possibility that the data characteristic is the first characteristic and possibility that the data is the second characteristic. According to the present embodiment, since the first data characteristic is the characteristic of the photographed image data, and the second data characteristic is the characteristic of the CG image data, the units of the output layer 504 represent the photographed image class possibility and the CG class possibility.

At a step S402, the data correction unit 112 calculates differences between the output values obtained at the previous step S401 and desired output values for determination that the data is photographed image data. The desired output values of the CG class possibility and the photographed image class possibility for the determination that the data is photographed image data can be calculated as the following numerical formulas (1) and (2).

$$\text{Desired value of photographed image class possibility} = \qquad (1)$$
$$0.5 + \frac{\text{Photographed image determination threshold}}{2}$$

$$\text{Desired value of CG class possiblity} = \qquad (2)$$
$$0.5 - \frac{\text{Photographed image determination threshold}}{2}$$

The differences calculated at the step S402 are a difference between the desired value of the photographed image class possibility and the photographed image class possibility and a difference between the desired value of the CG class possibility and the CG class possibility.

At a step S403, the data correction unit 112 uses the differences calculated at the previous step S402 to update the data by the backpropagation and obtains the update data. At this time, the learning parameters of the neural network are not updated but only the values of the data are updated by the backpropagation. The differences are propagated from the output layer of the neural network to the data input layer in the direction of the arrow 508 representing a backpropagation direction in FIG. 5, and the values of the data are updated such that the differences calculated at the step S402 are decreased.

According to the present embodiment, the data is image data, and the pixel values of the image are changed by the updating process. Through the above processes, the data is updated such that the output values of the data-characteristic-recognizing neural network, which is the recognizer that recognizes whether the data is CG data or photographed image data, approach the desired output values for the determination that the data is photographed image data. That is, the characteristic of the data for determination that the data is CG data is corrected (eliminated), and the update data is generated.

In the case where the data is combined image data of photographed image data and CG data and a mask for representing the area of the CG data is known, only the area (CG area) of the data that is specified by the mask may be updated. The update data may be combined data of pre-update data and post-update data such that data in the area specified by the mask is the post-update data and data in the other area is the pre-update data. When the data is sound data, the data correction unit 112 changes the values of the sound data. This completes the description of the data-updating process according to the present embodiment.

Returning to FIG. 3, at a step S306, the variable N representing the number of times the data-updating process is repeatedly performed is increased by 1. After the step S306, the flow returns to S302, and the data-updating process is repeatedly performed until the data is determined to be photographed image data.

At the step S303, the learning-weight-setting unit 114 sets the learning weight of the data. The process of the learning-weight-setting unit 114 will be described in detail later.

At a step S307, the data correction unit 112 stores the corrected data in the corrected-data-storing unit 124. The data correction unit 112 associates the target label attached to the data before correction and the learning weight set at the step S303 with the corrected data and also stores these in the corrected-data-storing unit 124.

At a step S308, the data correction unit 112 determines whether the above processes on all of the sets of the second characteristic data stored in the second characteristic-data-storing unit 121 are finished. When the processes are not finished, the flow returns to the step S301, and the processes are performed on another data. This completes the description of the correction process of the data correction unit 112 according to the present embodiment.

Figure 6:
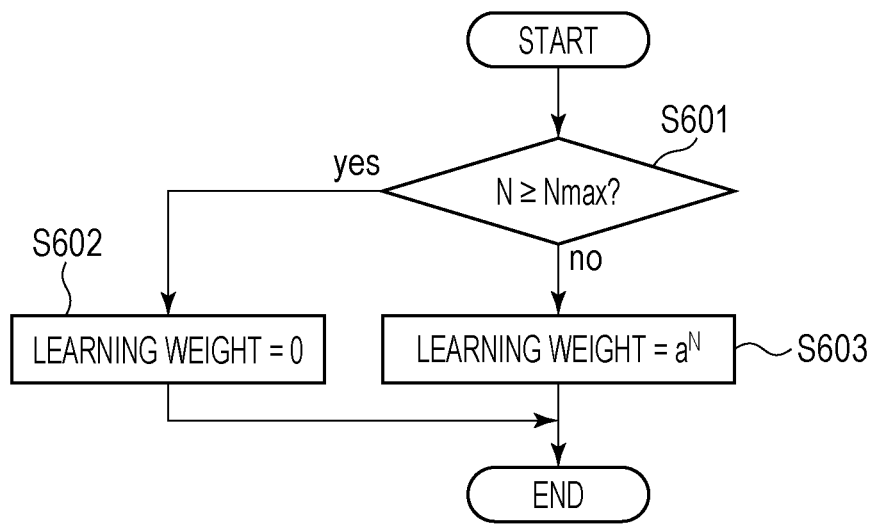
FIG. 6 is a flowchart of a setting process of a learning-weight-setting unit according to one or more aspects of the present disclosure.

A learning-weight-setting process of the learning-weight-setting unit 114 will now be described. FIG. 6 is a flowchart of the setting process of the learning-weight-setting unit 114 according to the present embodiment. At a step S601, the learning-weight-setting unit 114 determines whether the variable N in the flowchart in FIG. 3 is equal to or more than the threshold Nmax. When the variable N is equal to or more than Nmax, the flow proceeds to the step S602. When the variable N is less than Nmax, the flow proceeds to a step S603.

At the step S602, the learning-weight-setting unit 114 sets the learning weight to a predetermined value of 0. This means that, when the number of times data is corrected is equal to or more than the predetermined threshold Nmax, the data is not used for the learning process of the target recognizer S203. The learning weight when the variable N is equal to or more than the threshold Nmax is not necessarily set to 0, and may be set to a predetermined value (for example, a value close to 0).

At the step S603, the learning-weight-setting unit 114 sets the learning weight in accordance with the value of the variable N. At the step S603, the learning-weight-setting unit 114 sets the learning weight by using a function given as the following numerical formula (3):

$$\text{LEARNING WEIGHT} = a^N. \qquad (3)$$

In the numerical formula, a is a real value that is determined to be from 0 to 1. This is an example of the setting process in which the learning weight is decreased in accordance with the number of times the data is updated, which means that the number of the correction is regarded as reliability of the learning data, and the learning weight is decreased accordingly. The method of setting the learning weight by the learning-weight-setting unit 114 is not limited to the above method. For example, the learning weight may not be decreased in accordance with the variable N, but may be set by using another function. The learning weight may be decreased stepwise for a predetermined increased value of the variable N. This completes the description of the setting process of the learning-weight-setting unit 114 according to the present embodiment.

According to the present embodiment, there are two kinds of the data characteristics for simplicity of description. However, there may be two or more kinds of the data characteristics. In this case, for example, the first characteristic data, the second characteristic data, and third characteristic data are prepared, and the first learning unit 110 performs the learning process to enable the data-characteristic-recognizing neural network to distinguish among three kinds of the data characteristics. In the structure of the data-characteristic-recognizing neural network, the two units of the output layer 504 in FIG. 5 are changed to three units. In the correction process of the data correction unit 112 at the step S305, the data is corrected such that determination that the data has a predetermined data characteristic of the three data characteristics is made. An example of the case where there are sets of data having the data characteristics will be described below. In this example, there are kinds of photography equipment, one kind of the photography equipment is used for recognition, data obtained by another photography equipment is used, but a characteristic inherent in the other photography equipment is not learned. In another example, there are methods of generating artificial data such as CG data, and sets of the data generated by the methods have respective data characteristics.

According to the present embodiment described above, the data correction unit 112 can correct an inherent characteristic of specific data characteristics of data, such as artificial data (CG image data). The target recognizer that has learned by using the corrected data does not strongly react the characteristic inherent in the artificial data. Consequently, the accuracy of recognition can be improved.

Since the data correction unit 112 corrects (eliminates) the characteristic inherent in the artificial data such as CG data for the learning data, it is not necessary to use learning parameters for extracting the characteristic inherent in the artificial data. This enables the learning parameters to be efficiently used during learning. That is, according to the present embodiment, the accuracy of recognition can be improved without changing the number of the learning parameters. The present embodiment achieves the same degree of performance as existing techniques with a smaller number of the learning parameters. This means that memory usage is decreased, the number of hardware for calculation is decreased, and processing speed is increased.

In addition, the learning-weight-setting unit 114 adjusts the learning weight of data in accordance with the number of correction, this decreases the learning weight of data having data characteristics that differ from those of photographed image data, and the accuracy of recognition can be improved.

According to the present embodiment, the data correction unit 112 enables the corrected data (corrected second characteristic data) to be used in the same manner as the data before correction. Accordingly, when the data before correction is, for example, image data, the corrected data is also image data. To increase learning data variations, data transformation processes such as rotation, inversion, transformation, and color conversion are typically performed on images. These processes can be performed on the corrected data as it is.

According to the present embodiment, the process of the data correction unit 112 is independent of the process of the second learning unit 111, and the second learning unit 111 that performs the learning process of the target recognizer can use any learning method. In the case where a user uses an artificial image for learning as it is, after the first learning unit 110 and the data correction unit 112 are introduced to correct data, a learning method of a target recognizer that has been used can be used without any change.

Second Embodiment

A second embodiment of the present disclosure will now be described. According to the present embodiment, a characteristic of data characteristics is corrected as in the first embodiment, and a characteristic of the class of the target does not considerably change from the characteristic before data is corrected. That is, when the data is updated such that the characteristic inherent in CG is eliminated from image data, the characteristic of the content of the image data is inhibited from being changed. In the following description, the components described according to the first embodiment are designated by like reference numbers, and a description thereof is omitted.

Figure 7:
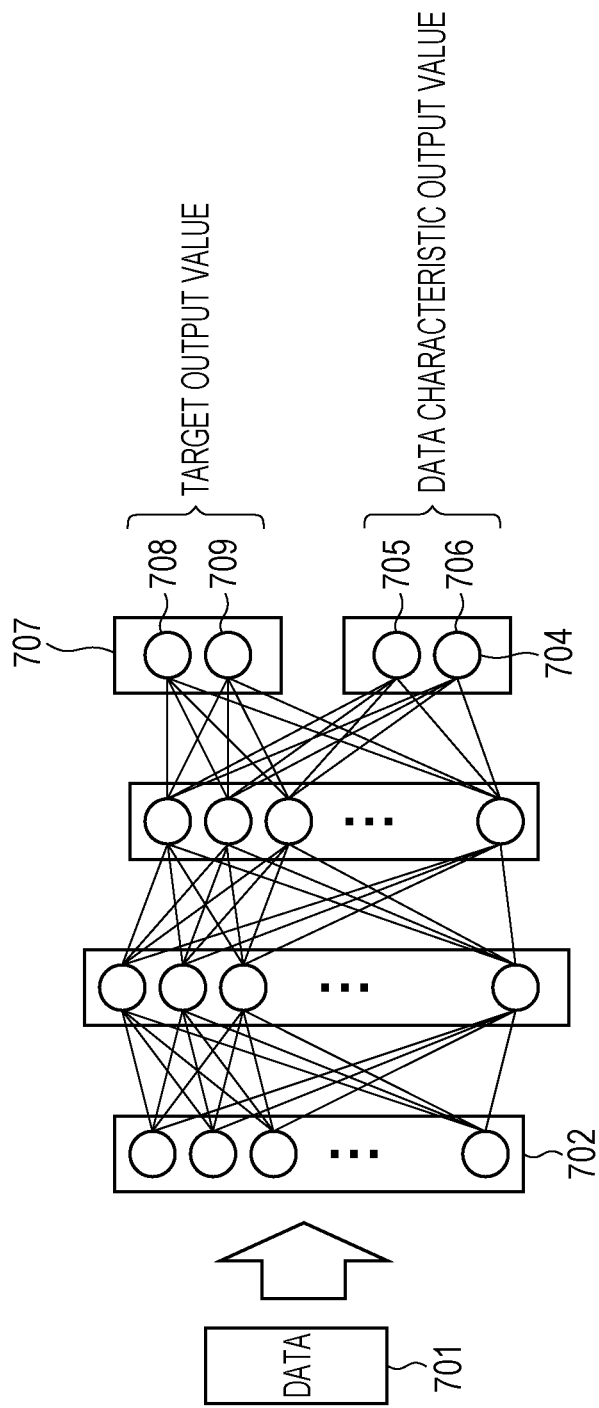
FIG. 7 is a schematic view of a data-characteristic-recognizing neural network according to one or more aspects of the present disclosure.

The present embodiment includes a target output value storing unit (not illustrated) that stores target output values described later. The present embodiment differs from the first embodiment in the structure of the data-characteristic-recognizing neural network of which the learning process is performed by the first learning unit 110, and objects to be learned. FIG. 7 illustrates the structure of the data-characteristic-recognizing neural network according to the present embodiment. FIG. 7 differs from FIG. 5 in that the neural network learns the data characteristics and target classes at the same time. There are an input layer 702 and two output layers. A data characteristic output layer 704 outputs class possibility (photographed image class possibility 705) of the first data characteristic and class possibility (CG class possibility 706) of the second data characteristic. A target output layer 707 outputs target class possibility 708 and non-target class possibility 709.

Labels are attached to the two output layers for learning. Such a learning method is typically known as multitask learning, and a detailed description thereof is omitted. According to the present embodiment, the target output layer 707 is configured for two-class recognition. The present disclosure, however, is not limited thereto. The target output layer 707 may be configured for multiclass recognition such as two-or-more-class recognition or regression learning in which the output is the result of recognition that is represented by real numbers.

Figure 8:
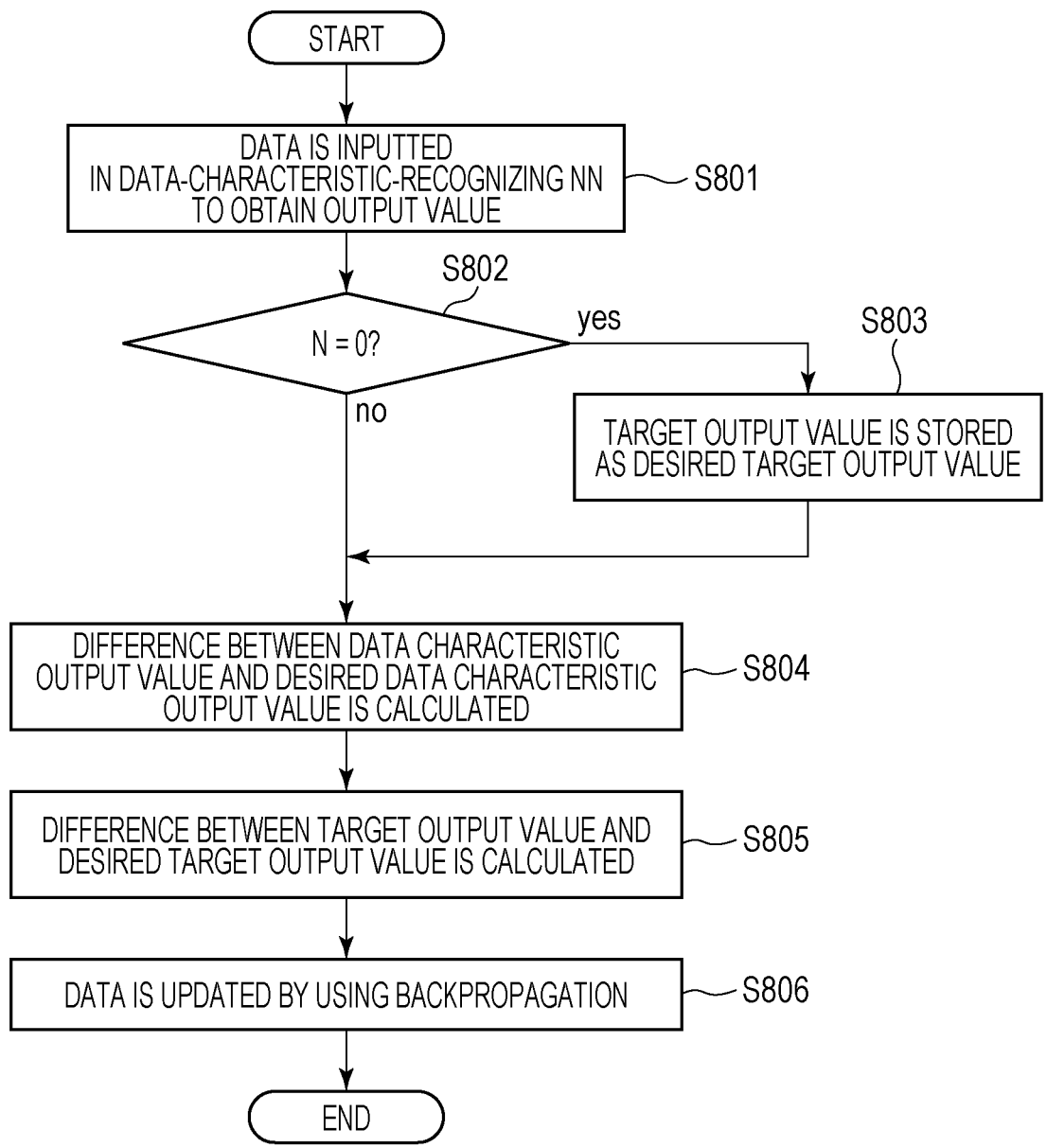
FIG. 8 is a flowchart of the detail of a data-updating process according to one or more aspects of the present disclosure.

The present embodiment differs from the first embodiment in the data-updating process of the data correction unit 112 at the step S305 in FIG. 3. FIG. 8 is a flowchart of the data-updating process that the data correction unit 112 according to present embodiment performs at the step S305. At a step S801, the data correction unit 112 inputs data 701 into the data-characteristic-recognizing neural network according to the present embodiment illustrated in FIG. 7 and obtains output values. The output values are outputted from the data characteristic output layer 704 and the target output layer 707 in the following description, the former is referred to as data characteristic output values, and the latter is referred to as the target output values.

At a step S802, whether the variable N that is set at the step S301 and updated at the step S306 in FIG. 3 is 0 is determined. That is, whether the data to be processed has never been updated is determined. When the variable N is 0, the flow proceeds to a step S803. When the variable N is not 0, the flow proceeds to a step S804.

At the step S803, the data correction unit 112 stores the target output values of the output values obtained at the step S801 in the target output value storing unit. The target output values stored at this time are values when the variable N is 0. That is, the target output values before the data-updating process on the data are stored in a desired-target-output-value-storing unit.

At the step S804, the data correction unit 112 calculates differences between the data characteristic output values obtained at the step S801 and desired data characteristic output values for determination that the data is photographed image data as in the process at the step S402 in FIG. 4. The desired data characteristic output values for the determination that the data is photographed image data can be calculated as the numerical formula (1) and the numerical formula (2) as in the description of the step S402 in FIG. 4. At a step S805, the data correction unit 112 calculates differences between the target output values obtained at the step S801 and the desired target output values stored at the step S803.

At a step S806, the data correction unit 112 updates the data by the backpropagation by using the differences related to the data characteristic that are calculated at the step S804 and the differences related to the target that are calculated at the step S805. During the backpropagation, different weights may be placed on the backpropagation from the differences related to the data characteristic and the backpropagation from the differences related to the target. The weights enable adjustment in preferences between the effect of correcting the data to eliminate the characteristic inherent in CG from the data and the effect of storing the characteristic related to the target.

According to the present embodiment, during the backpropagation, the result of the target output before the data is updated is not changed. However, another method may be considered. For example, target output values are predetermined as the respective desired target output values, and the output values are obtained during backpropagation. In this case, the target output values are stored as the respective desired target output values, although the initial values of the target output values of the data-characteristic-recognizing neural network are stored at the step S803 described above.

According to the present embodiment, the first learning unit 110 of the information processing apparatus performs the learning process of the neural network such that the characteristic related to the class of the target does not considerably change from the characteristic before data is corrected. According to the present embodiment, however, the data correction unit 112 may correct the data by using a data-characteristic-recognizing neural network that has learned in the above manner with another apparatus.

According to the present embodiment described above, when data is updated such that the characteristic inherent in CG is eliminated (corrected) from image data, the characteristic of the content of the image data is inhibited from being changed from the characteristic before the data is updated.

Third Embodiment

A third embodiment of the present disclosure will now be described. The present embodiment is characterized in that the learning-weight-setting unit 114 sets the learning weight in accordance with a data correction of the data corrected by the data correction unit 112. In the following description, the components described according to the first and second embodiments are designated by like reference numbers, and a description thereof is omitted.

Figure 9:
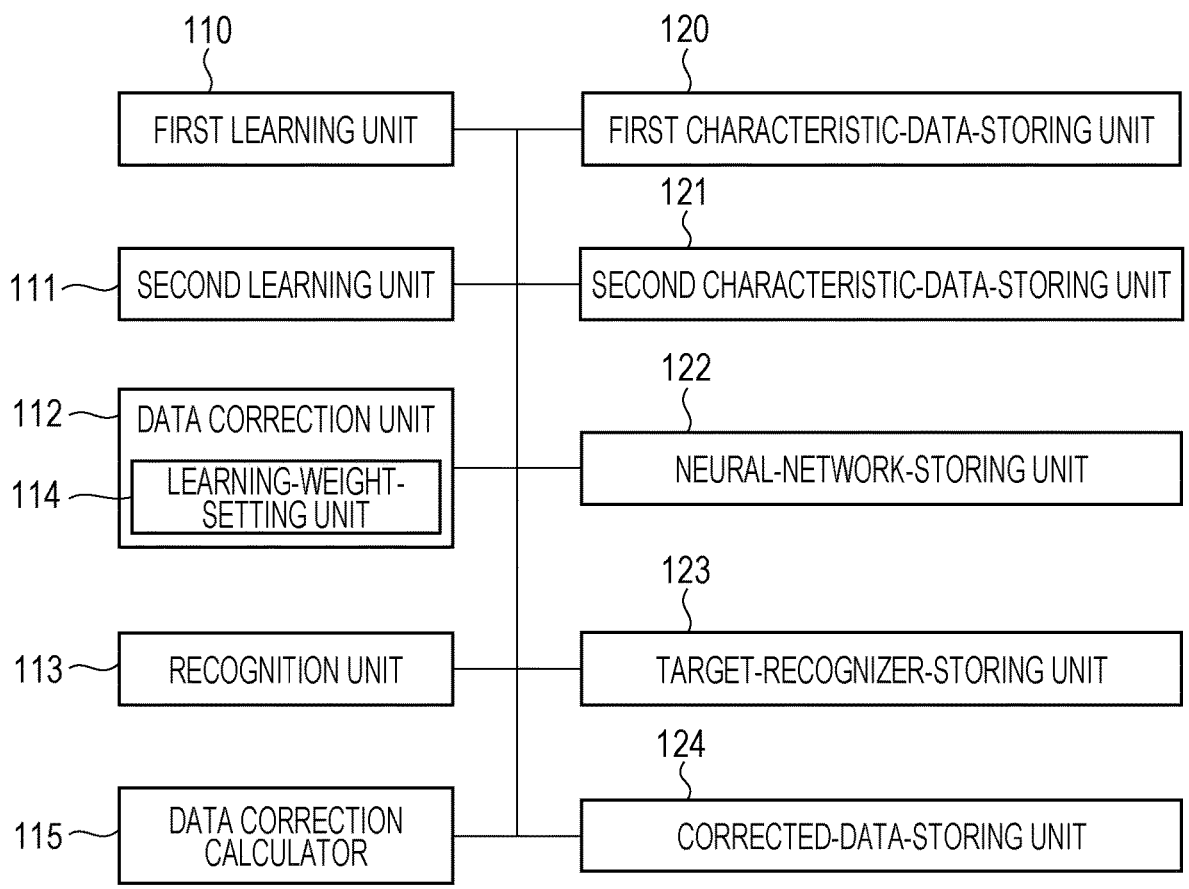
FIG. 9 is a schematic block diagram of an information processing apparatus according to one or more aspects of the present disclosure.

FIG. 9 is a schematic block diagram of an information processing apparatus according to the present embodiment. The information processing apparatus according to the present embodiment differs from the information processing apparatus according to the first embodiment in that the learning-weight-setting unit 114 according to the present embodiment includes a data correction calculator 115 as a sub-functional unit, and the process of the learning-weight-setting unit 114 is different from that in the first embodiment.

Figure 10:
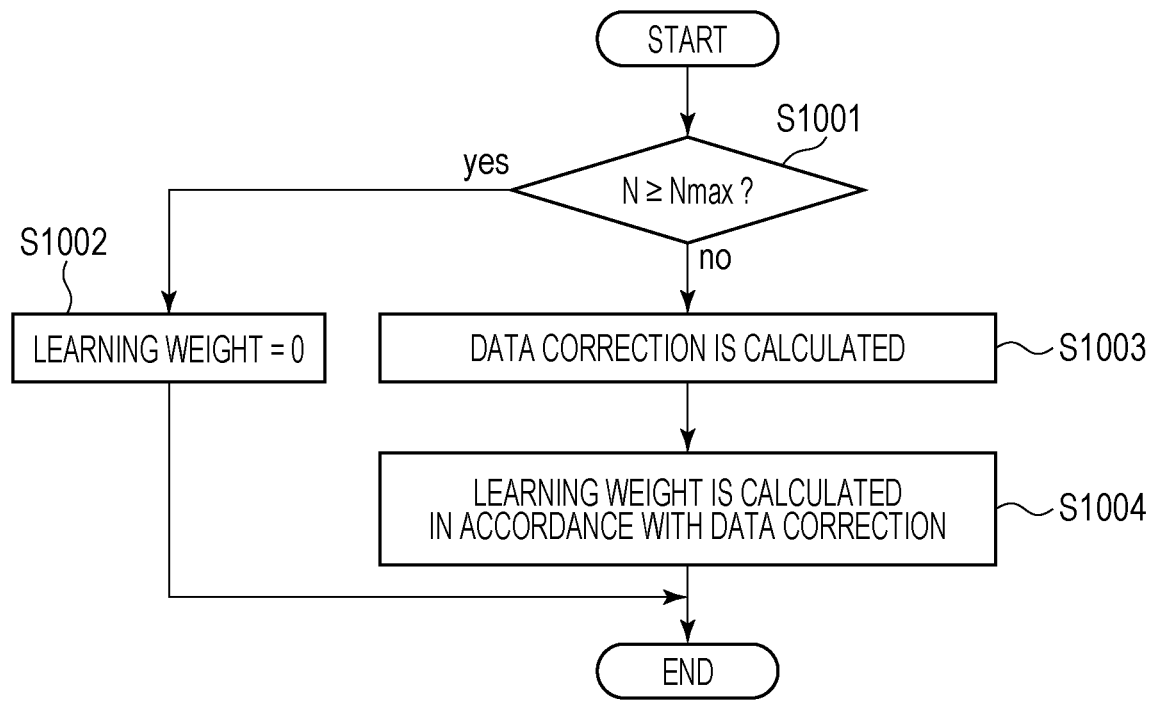
FIG. 10 is a flowchart of a setting process of a learning-weight-setting unit according to one or more aspects of the present disclosure.

FIG. 10 is a flowchart of the setting process of the learning-weight-setting unit 114 according to the present embodiment. At a step S1001, the learning-weight-setting unit 114 determines whether the variable N is equal to or more than the predetermined threshold Nmax. When the variable N is equal to or more than the threshold Nmax, the flow proceeds to a step S1002, and the learning weight is set to a certain value (for example, 0). When the variable N is less than the threshold Nmax, the flow proceeds to a step S1003.

At the step S1003, the data correction calculator 115 calculates the data correction. The data correction calculator 115 quantifies the difference between data before the data correction unit 112 corrects the data and data corrected by the data correction unit 112. The calculation method to quantify the difference is not particularly limited. For example, the following methods (1) and (2) may be used for calculation.

(1) The root mean square of the difference between the data before correction and the corrected data is calculated. For example, when the data is image data, the root mean square of an image difference is calculated following numerical formula (4):

$$\sqrt{\frac{1}{N}\sum_{i=0}^{N}\{(r_i - r'_i)^2 + (g_i - g'_i)^2 + (b_i - b'_i)^2\}}, \quad (4)$$

where N is the total number of pixels of the image, i is an index of each pixel, (r, g, b) is a RGB pixel value of the image before correction, and (r', g', b') is a RGB pixel value of the image after correction. When a correction in the position of each pixel is negligible, a difference in each pixel that is equal to or less than a predetermined threshold may be regarded as 0 in the calculation. When the data is not image data, the same calculation can be made.

(2) The root mean square of each unit is calculated by using the output values obtained when the data before correction is inputted into the data-characteristic-recognizing neural network and the output values obtained when the corrected data is inputted thereto. For example, the root mean square is calculated as the following numerical formula (5):

$$\sqrt{\frac{1}{N}\sum_{i=0}^{N}\{(u_i - u'_i)^2\}}, \quad (5)$$

where N is the number of the units of the output layer, i is an index of each unit of the output layer, u is the output value of each unit of the output layer with respect to the data before correction, u' is the output value of each unit of the output layer with respect to the corrected data.

At a step S1004, the learning-weight-setting unit 114 converts the correction calculated at the previous step S1003 into a learning weight, and the learning weight is set to the converted learning weight. The correction is converted into the learning weight in such a manner that as the data correction increases, the learning weight decreases, and the learning weight ranges from 0 to 1.

Although the learning weight is set in accordance with the number of times the data is updated according to the first embodiment, the learning weight is set in accordance with the correction of the data corrected by the data correction unit 112 according to the present embodiment. In this way, the present embodiment enables the learning weight to be set in accordance with what degree the data is actually corrected regardless of the number of update.

Fourth Embodiment

A fourth embodiment according to the present disclosure will now be described. According to the present embodiment, a display unit displays which part of data is corrected by the data correction unit 112 and what degree the data is corrected in the following description, the components described according to the first to third embodiments are designated by like reference numbers, and a description thereof is omitted.

Figure 11:
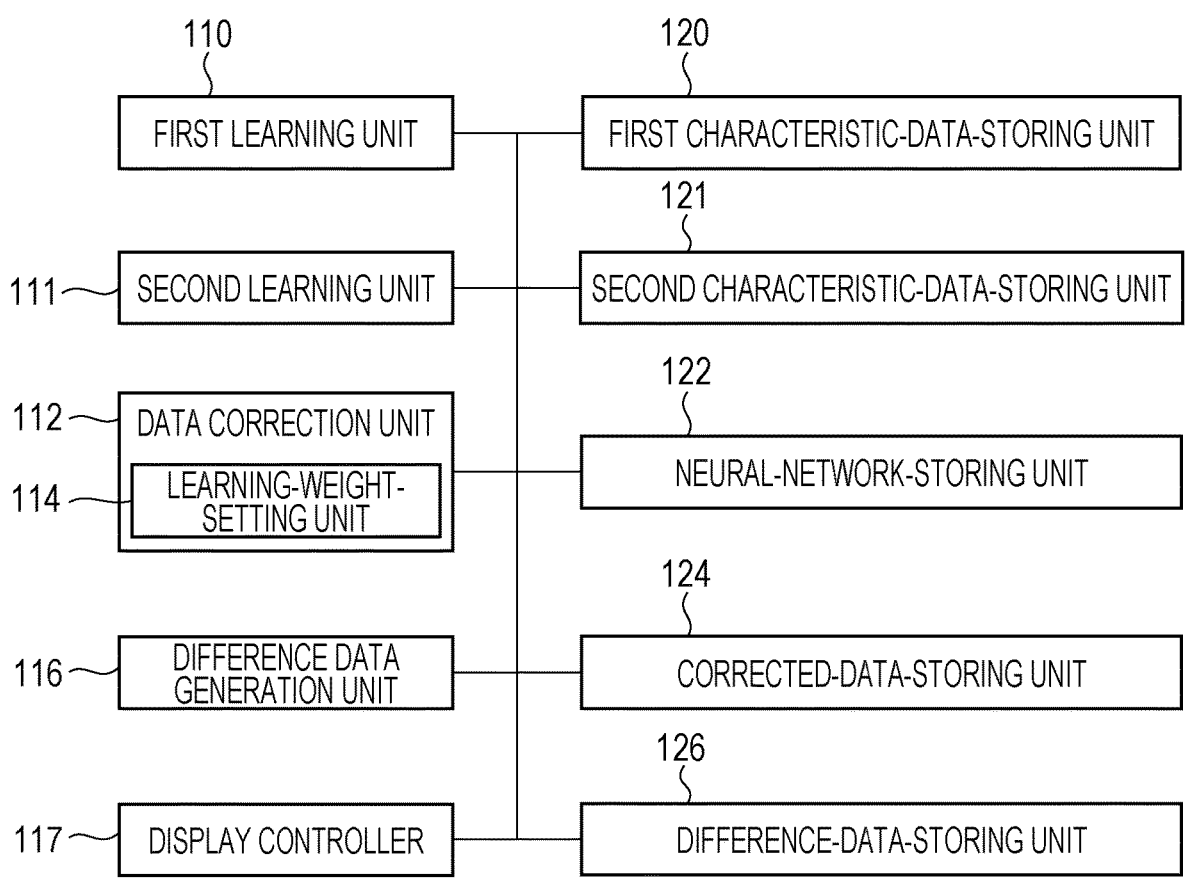
FIG. 11 is a schematic block diagram of an information processing apparatus according to one or more aspects of the present disclosure.

FIG. 11 is a schematic block diagram of an information processing apparatus according to the present embodiment. The information processing apparatus according to the present embodiment includes a difference data generation unit 116 that generates difference data between the data before correction and the corrected data, a display controller (a display control unit) 117 that causes the display unit to display the difference data, and a difference-data-storing unit 126 that stores the generated difference data. A description of the functional units for the learning process of the target recognizer is omitted. It is assumed that the corrected data generated by the method described according to the first embodiment or the second embodiment has been stored in the corrected-data-storing unit 124. After the corrected data is stored in the corrected-data-storing unit 124, the process of the display controller 117 described according to the present embodiment can be performed at any time.

Figure 12:
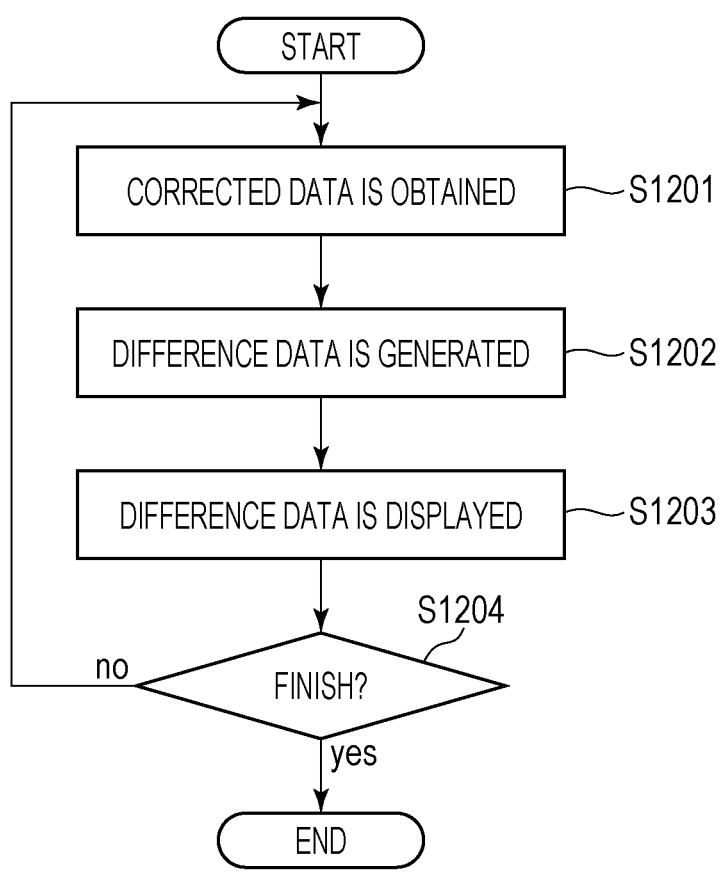
FIG. 12 is a flowchart of a difference-data-displaying process according to one or more aspects of the present disclosure.

FIG. 12 is a flowchart of a difference-data-displaying process according to the present embodiment. The process of the display controller 117 according to the present embodiment starts when a user selects a set of data in the second characteristic-data-storing unit 121 by using an input unit (such as a mouse or a keyboard) of the information processing apparatus. The data selected by the user is referred to below as "pre-correction data". A user may not select the data every time. The following processes may be repeatedly performed on data that satisfies all or part of conditions specified by a user.

At a step S1201, the difference data generation unit 116 loads a set of data corresponding to the pre-correction data selected by the user from sets of data stored in the corrected-data-storing unit 124. This data is referred to as "post-correction data". At the step S1201, the post-correction data may not be obtained from the corrected-data-storing unit 124, and alternatively, the data correction unit 112 may generate the post-correction data corresponding to the pre-correction data selected by the user as needed.

Subsequently, at a step S1202, the difference data generation unit 116 generates difference data between the pre-correction data and the post-correction data and stores the difference data in the difference-data-storing unit 126. The method of generating the difference data is not particularly limited. For example, the difference data is generated as image data the pixel values of which are Euclidean distances of pixel values in dimensions of the data. For example, when the data is image data, the pixel values of difference image data that is generated are Euclidean distances of RGB values of two images at the position of each pixel. At this time, the pixel values may be converted to color in accordance with the magnitude of the pixel values of the difference image data. In a color chart that is typically used, the larger the magnitude the nearer the color to red, the smaller the magnitude, the nearer the color to blue.

Subsequently, at a step S1203, the display controller 117 causes a display unit 104 to display the generated difference data. An example of the display unit 104 is a liquid-crystal display. At this time, the display controller 117 may cause the display unit to display the difference data at a certain degree of transparency such that the difference data overlaps the pre-correction data or the post-correction data. Alternatively, only a part of the difference data a difference value of which is equal to or more than a predetermined threshold may be displayed.

At a step S1204, the display controller 117 queries a user whether the process is finished. When the answer is not finish, the flow returns to the step S1201, and the difference data generation unit 116 selects data that will be subsequently displayed. When the answer is finish, the process is finished.

According to the present embodiment, a user selects the pre-correction data, and the difference from the post-correction data corresponding to the pre-correction data is displayed. However, the post-correction data may be selected, and the difference from the pre-correction data corresponding to the post-correction data may be displayed. A user may not select the data to be displayed. The data may be automatically selected in order of the magnitude of the correction, or data the correction of which exceeds a predetermined threshold may be automatically selected in order. In this case, the data correction may be calculated by, for example, the method described according to the third embodiment.

According to the present embodiment described above, it is assumed that the corrected data has been stored in the corrected-data-storing unit 124. However, the corrected data may not be generated in advance. In this case, the data correction unit 112 can generate the post-correction data with respect to the pre-correction data selected by a user at any time, provided that the learning process of the data-characteristic-recognizing neural network is finished.

According to the present embodiment described above, the data is image data. However, the data is not limited to image data and may be, for example, sound data. A method of displaying the waveform or spectrum of the sound data is thought to be an example of a method of visualizing the sound data. In this case, differences in sound waveform or spectrum between the pre-correction data and the post-correction data may be displayed.

Thus, according to the present embodiment, a user can know which part of data that is artificially generated, such as CG data, represents the characteristic inherent in the artificial data. Consequently, the user can check the quality of the artificial data and know notes when the artificial data is generated.

Another Embodiment

The present disclosure can be carried out also in the case where programs that achieve the functions according to the above embodiments are supplied to a system or an apparatus via a network or a storage medium and processors of a computer of the system or the apparatus read and perform the programs. The present disclosure can be carried out also by using a circuit (for example, ASIC) having the functions.

According to the present disclosure, art inherent characteristic of the data characteristics of data can be corrected.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims is to be accorded the broadest interpretation so as to encompass all such modifications and equivalent structures and functions.

This application claims the benefit of Japanese Patent Application No. 2017-059238 filed Mar. 24, 2017, which is hereby incorporated by reference herein in its entirety.

What is claimed is:

1. An information processing apparatus comprising:
one or more processors; and
at least one memory coupled to the one or more processors, the memory having stored thereon instructions which, when executed by the one or more processors, cause the image processing apparatus to:
train a determiner to determine whether a characteristic of data is a first characteristic or a second characteristic using training data of a first characteristic and training data of a second characteristic;
amend the training data of the second characteristic to be recognized as the first characteristic by the trained determiner; and
train a recognizer to recognize an object in data using the training data of the first characteristic and the amended training data of the second characteristic,
wherein the determiner outputs possibility that the data has first characteristic,
wherein the determiner determines the characteristic of data using a neural network, and
wherein the training data of the second characteristic is amended such that a difference between possibility of the first characteristic of the data and the possibility that the data has the second characteristic is equal to or more than a predetermined threshold.

2. The information processing apparatus according to claim 1,
wherein the determiner determines the characteristic of data using a neural network, and
wherein the training data of the second characteristic is amended by backpropagation of a difference between the second characteristic and the first characteristic.

3. The information processing apparatus according to claim 1,
wherein the training data of the second characteristic is amended such that a result of recognition of the object does not change.

4. The information processing apparatus according to claim 1 wherein the instructions, when executed by the one or more processors, further cause the apparatus to:
set a weight used for training the recognizer by using the amended training data corrected.

5. The information processing apparatus according to claim 4, wherein the weight is set on a basis of a number of times of amending the data by backpropagation of a difference between the second characteristic of the data and the first characteristic.

6. The information processing apparatus according to claim 4, wherein the weight is set on a basis of an amendment of the data.

7. The information processing apparatus according to claim 1, wherein the instructions, when executed by the one or more processors, further cause the apparatus to:
display a difference between the training data and the amended training data.

8. The information processing apparatus according to claim 1, wherein the data is image data.

9. The information processing apparatus according to claim 8, wherein the second characteristic of the data is a characteristic related to computer graphics, and the first characteristic is a characteristic related to a photographed image.

10. The information processing apparatus according to claim 8, wherein the second characteristic of the data is a characteristic related to a kind of equipment that photographs the data or a characteristic related to an environment under which the data is photographed.

11. An information processing method comprising:
storing a neural train a determiner to determine whether a characteristic of data is a first characteristic or a second characteristic using training data of a first characteristic and training data of a second characteristic;
amending the training data of the second characteristic to be recognized as the first characteristic by the trained determiner; and
training a recognizer to recognize an object in data using the training data of the first characteristic and the amended training data of the second characteristic,
wherein the determiner outputs possibility that the data has first characteristic,
wherein the determiner determines the characteristic of data using a neural network, and
wherein the training data of the second characteristic is amended such that a difference between possibility of the first characteristic of the data and the possibility that the data has the second characteristic is equal to or more than a predetermined threshold.

12. The information processing method according to claim 11,
wherein the determiner determines the characteristic of data using a neural network, and
wherein the training data of the second characteristic is amended by backpropagation of a difference between the second characteristic and the first characteristic.

13. A non-transitory storage medium storing instructions that when executed by one or more processors controls the one or more processors to implement an information processing method comprising:
storing a neural train a determiner to determine whether a characteristic of data is a first characteristic or a second characteristic using training data of a first characteristic and training data of a second characteristic;
amending the training data of the second characteristic to be recognized as the first characteristic by the trained determiner; and
training a recognizer to recognize an object in data using the training data of the first characteristic and the amended training data of the second characteristic, wherein the determiner outputs possibility that the data has first characteristic, wherein the determiner determines the characteristic of data using a neural network, and wherein the training data of the second characteristic is amended such that a difference between possibility of the first characteristic of the data and the possibility that the data has the second characteristic is equal to or more than a predetermined threshold.

* * * * *